US006730743B2

(12) United States Patent
Nakagawa et al.

(10) Patent No.: US 6,730,743 B2
(45) Date of Patent: May 4, 2004

(54) RUBBER COMPOSITION

(75) Inventors: Ryuji Nakagawa, Tokyo (JP); Hideaki Yokoyama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/988,288

(22) Filed: Nov. 19, 2001

(65) Prior Publication Data

US 2002/0099123 A1 Jul. 25, 2002

(30) Foreign Application Priority Data

Nov. 17, 2000 (JP) .......................................... 2000-351357

(51) Int. Cl.7 .............................................. C08F 210/08
(52) U.S. Cl. ..................... 525/241; 526/347; 526/347.1
(58) Field of Search ....................... 525/241; 526/347.1, 526/347

(56) References Cited

U.S. PATENT DOCUMENTS 2,213,423 A  9/1940  Wiezevich et al.
2,618,624 A  11/1952  Sparks et al.

FOREIGN PATENT DOCUMENTS

EP  0 889 091 A1 *  1/1999

* cited by examiner

*Primary Examiner*—Robert Harlan
(74) *Attorney, Agent, or Firm*—Sughrue Mion, PLLC

(57) ABSTRACT

A rubber composition which is obtained by compounding 100 parts by weight of a rubber component and 3 to 250 parts by weight of an olefin-aromatic vinyl compound copolymer.

The rubber composition exhibits an excellent gripping property, an excellent resistance to fracture and an excellent abrasion resistance simultaneously and can be applied to tires, and industrial products such as vibration isolation rubbers.

10 Claims, No Drawings

RUBBER COMPOSITION

BACKGROUND OF THE INVENTION

1. Field of the Invention

The present invention relates to a rubber composition which can be applied to various products such as tires, vibration isolation rubbers and belts and, more particularly, to a rubber composition which exhibits an excellent gripping property and excellent resistance to fracture and is advantageously applied to treads of pneumatic tires.

2. Description of the Related Arts

As higher safety in automobile driving is attracting attention in recent years, a more excellent gripping property in both good weather and bad weather is required for automobile tires. In particular, improvement in the gripping property is important for decreasing the braking distance of an automobile. To satisfy this requirement, it is desired that ability of a rubber composition used for a tire tread to grip the road surface be improved to a still higher level.

Various developments have been made to obtain a rubber composition having an excellent gripping property. As a typical example of such development, a highly filled rubber composition containing large amounts of oil and filler which has an excellent gripping property in good weather (dry gripping property) has been provided. A highly filled rubber composition containing large amounts of oil and filler has a large tan δ value in the temperature-frequency region relating to gripping property so that kinetic energy can be converted into thermal energy effectively, and an excellent gripping property is exhibited. In other words, to enhance dry gripping property of a rubber composition, it is important that hysteresis loss property, which can be represented by tan δ, in the temperature range from room temperature to about 100° C. is increased. When such a highly filled rubber composition is used, however, a drawback arises in that sufficient entanglements among polymer molecules may not surely be formed since an oil having a low molecular weight is used, and fracture resistance may decrease although an excellent loss property can be surely exhibited.

To prevent a decrease in fracture resistance, it is effective that a low molecular weight polymer having a higher molecular weight than that of an oil is used as a softener. Some problems arise, however, in the use of such a low molecular weight polymer.

When a low molecular weight diene polymer which is heretofore attempted to be used, i.e., a liquid styrene-butadiene copolymer (liquid SBR) or a liquid polybutadiene (liquid BR), is used, a crosslinking reaction takes place in the polymer during vulcanization of the rubber composition since the diene polymer has double bonds in the molecule. Therefore, the obtained rubber product does not always exhibit a satisfactory modulus. Moreover, the molecular weight is limited in order to obtain a sufficient loss property.

To overcome the above problems, the use of a low molecular weight saturated polymer has been attempted. Liquid polybutene is a typical example of the low molecular weight saturated liquid polymer used for rubber compositions. When a saturated polymer is used, a drawback arises in that blooming takes place on the rubber composition due to insufficient compatibility with the diene polymer compounded as a rubber component.

As another method for improving the gripping property, it is known that rubber component having a high glass transition temperature can be used for the rubber composition for a tire tread. When a rubber having a high glass transition temperature is used, however, the temperature range in the use of the tire should be limited since the rubber tends to become rigid in low temperature range. Therefore, it is difficult that a rubber having a high glass transition temperature is used for such a rubber composition.

From the standpoint of safety, it is required that fracture resistance and gripping property of the tread rubber be further improved.

SUMMARY OF THE INVENTION

Under above circumstances, the present invention has an object of providing a rubber composition which exhibits an excellent gripping property, an excellent fracture resistance and an excellent abrasion resistance simultaneously by using a novel formulation.

As the result of intensive studies by the present inventors to achieve the above object with particular attention paid to improvement in the compatibility between a saturated polymer and a diene rubber, it was found that an excellent fracture resistance, an excellent abrasion resistance and an excellent dry gripping property can be simultaneously exhibited by using a copolymer of a monoolefin and an aromatic vinyl compound, which is not heretofore used in formulations of a rubber composition, in combination with a diene polymer conventionally used as a rubber component. The present invention has been completed based on the knowledge.

The present invention provides a rubber composition which is obtained by compounding 100 parts by weight of a rubber component and 3 to 250 parts by weight of an olefin-aromatic vinyl compound copolymer.

DESCRIPTION OF THE PREFERRED EMBODIMENTS

In the rubber composition of the present invention, the olefin-aromatic vinyl compound copolymer is used in an amount of 3 parts by weight or more and 250 parts by weight or less per 100 parts by weight of rubber component. It is preferable that the olefin-aromatic vinyl compound copolymer is used in an amount in the range of 3 to 150 parts by weight and more preferably in the range of 5 to 100 parts by weight per 100 parts by weight of the rubber component. When either abrasion resistance or gripping property is emphasized, the amount of the olefin-aromatic vinyl compound copolymer can be adjusted within the above range in accordance with the emphasis. When abrasion resistance is emphasized, it is preferable that the amount is relatively small, i.e., about 5 to 20 parts by weight. When gripping property is emphasized, it is preferable that the amount is about 30 to 100 parts by weight.

As the rubber component used in the present invention, natural rubber and various diene synthetic rubbers may be used, Examples of the diene synthetic rubber include butadiene based polymers, such as polybutadiene (BR), copolymer of butadiene and another diene monomer, and copolymer of butadiene and an aromatic vinyl compound monomer, isoprene based polymers, such as polyisoprene (IR), copolymer of isoprene and another diene monomer, and copolymer of isoprene and an aromatic vinyl compound monomer, butyl rubber (IIR), ethylene-propylene based copolymers and mixtures of these rubbers. Among these rubbers, butadiene based polymers and isoprene based polymers are preferable, and styrene-butadiene copolymer rubber (SBR) is more preferable.

Microstructures of SBR are not specifically limited and can be chosen depending upon the requested properties thereof, but it is preferable that SBR contains 5 to 60% by weight, and more preferably 15 to 45% by weight of bound styrene.

It is more preferable that the rubber component comprises 50% or more of the SBR and it is most preferable that the rubber component is entirely composed of SBR.

Examples of diene monomers include 1,3-butadiene, isoprene, 1,3-pentadiene, 2,3-dimethylbutadiene, 2-phenyl-1,3-butadiene and 1,3-hexadiene. The monomer components may be used singly or as a mixture of two or more. Among the above monomer components, 1,3-butadiene is preferable.

Examples of vinyl aromatic hydrocarbon monomers include styrene, α-methylstyrene, 1-vinylnaphthalene, 3-vinyltoluene, ethylvinylbenzene, divinylbenzene, 4-cyclohexylstyrene and 2,4,6-trimethylstyrene. Among these monomer components, styrene is preferable.

As the diene synthetic rubber, rubbers synthesized in accordance with any of a radical emulsion polymerization, a coordination polymerization and an ionic solution polymerization can be used. The diene synthetic rubber may have a branched structure formed by a polyfunctional modifier such as tin tetrachloride and silicon tetrachloride.

The Mooney viscosity ($ML_{1+4}$, 100° C.) of the rubber component used in the present invention is preferabaly in the range of 10 to 250 and more preferably in the range of 30 to 200. As the Mooney viscosity becomes lower, fracture resistance of the vulcanized rubber composition lowers, while the Mooney viscosity exceeds 250, the processability of an unvulcanized rubber lowers and mixing becomes difficult.

Examples of the olefin used for the olefin-aromatic vinyl compound copolymer used in the rubber composition of the present invention include monoolefins such as ethylene, propylene, 1-butene, 2-butene, isobutene, 1-hexene, 1-octene, 1-heptene and 1-decene. Among these olefins, ethylene is preferable from the standpoint of the availability and the high reactivity in copolymerization with the aromatic vinyl compound. The above monomers may be used alone or as a mixture of two or more.

Examples of the aromatic vinyl compound include styrene, α-methylstyrene, 1-vinylnaphthalene, 3-vinyltoluene, ethylvinylbenzene, divinylbenzene, 4-cyclohexylstyrene and 2,4,6-trimethylstyrene. Among these compounds, styrene is preferable from the standpoint of availability and the high reactivity in copolymerization with the olefins.

As the olefin-aromatic vinyl compound copolymer, copolymers of styrene and an α-olefin are preferable and copolymers of styrene and ethylene are more preferable.

The above olefin-aromatic vinyl compound copolymer used in the present invention can be synthesized in accordance with a conventional process. Examples of the conventional process include processes described in Claudio Pellecchia, Macromolecules, (2000) 33, 2807–2814, Guangxue Xu, Macromolecules, (1997) 30, 685–693, Leone Oliva, Macromolecules, (1997) 30, 5616–5619, Vincenzo Venditto, Macromolecules, (1998) 31, 4027–4029, Leone Oliva, Macromolecules, (1999) 32, 2675–2678, Longo, P., Makromol. Chem., (1990) 191, 2387, Steavens, J. C., Eur. Pat. Ap. 416815 (1991), Chem. Abstr., (1994) 121, 58212 and EP 0416815.

It is preferable that the molecular weight of the olefin-aromatic vinyl compound copolymer used in the present invention is about 2,500 to 700,000 as measured by using GPC and expressed as the molecular weight of corresponding polystyrene. As the molecular weight becomes smaller, the effect of improving gripping property, fracture resistance and abrasion resistance becomes less, while the molecular weight becomes larger, the operation of producing rubber products such as tires becomes more difficult.

It is preferable that the content of the aromatic vinyl compound in the olefin-aromatic vinyl compound copolymer is 3 to 80% by weight and more preferably 10 to 60% by weight. As the content becomes less, the effect of improving gripping property and fracture resistance becomes less, while the content becomes large, it becomes difficult to surely obtain sufficient affinity (compatibility) with the rubber component.

It is preferable that the difference between the contents (the values in percent by weight) of the bound aromatic vinyl compound in the olefin-aromatic vinyl compound copolymer and that in the entire rubber component exceeds 10 and more preferably it is not less than 15. As this difference becomes larger, compatibility between the olefin-aromatic vinyl compound copolymer and the rubber component becomes better and gripping property, fracture resistance and abrasion resistance becomes better.

More specifically, when an ethylene-styrene copolymer containing 20% by weight of styrene is used, the above description means that the content of the bound styrene in the entire rubber component used in combination with the copolymer is preferably 10% by weight or less. For example, when the rubber component is composed of the same amount by weight of SBR and BR, the amount of the bound styrene in SBR is preferably 20% by weight or less.

It is preferable that the rubber composition of the present invention comprises a filler. Any filler can be used as long as the filler can be used for an ordinary rubber composition. It is preferable that the filler is a reinforcing filler comprising at least one of carbon black, silica and aluminas.

Carbon black is not particularly limited. Examples of the carbon black include SRF, GPF, FEF, HAF, ISAF and SAF. Carbon black having an iodine adsorption (IA) of 60 mg/g or larger, or a dibutyl phthalate absorption (DBP) of 80 ml/100 g or larger is preferable. The effect of improving gripping property and fracture resistance can be enhanced by using a carbon black. HAF, ISAF and SAF which can provide excellent abrasion resistance are more preferable.

Silica is not particularly limited. Examples of the silica include wet silica (hydrous silica), dry silica (silicic acid anhydride), calcium silicate and aluminum silicate. Among these silica, wet silica which exhibits excellent effects on improvement in fracture resistance, and simultaneous improvements in wet gripping property and low rolling resistance is preferable.

As an alumina, those which can be represented by the following general formula (I) is preferably used:

$$Al_2O_3 \cdot nH_2O \tag{I}$$

wherein n is 0 to 3.

As the other inorganic fillers, the materials represented by the following general formula (II) are preferably used:

$$mM_1 \cdot xSiO_y \cdot zH_2O \tag{II}$$

wherein $M_1$ is at least one metal selected from the group consisting of aluminum, magnesium, titanium, and calcium, or at least one selected from the group consisting of an oxide or a hydroxide of these metals, and a hydrate of these oxide or hydroxide, m, x, y and z are an integer of 1 to 5, o to 10, 2 to 5 and 0 to 10, respectively, and further, the inorganic fillers may contain a metal such as potassium, sodium, iron and magnesium, or an element such as fluorine.

Typical examples of the inorganic fillers include silica, an alumina-hydrate($AL_2O_3.H_2O$), gibbsite, an aluminum hydroxide[$Al(OH)_3$] such as bayerite, a magnesium hydroxide [$Mg(OH)_3$], a magnesium oxide (MgO), talc, ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_3$], aluminum-magnesium oxide ($MgO.Al_2O_3$), clay($Al_2O_3.2SiO_2$), kaolin ($Al_2O_3.2\ SiO_2.2H_2O$), pyrophyllite($Al_2O_3.4\ SiO_2.H_2O$), bentonite ($Al_2O_3.4SiO_2.2H_2O$), aluminum silicate ($Al_2SiO_5.Al_4.3SiO_4.5H_2O$ etc), magnesium silicate ($Mg_2SiO_4$, $MgSiO_3$ etc), calcium silicate($Ca_2SiO_4$ etc.), aluminum-calcium silicate($Al_2O_3.CaO.2SiO_2$ etc), magnesium-calcium silicate($CaMgSiO_4$), hydrogen to correct electric charge such as various zeolites, feldspar, mica and the like. As an inorganic filler to meet the general formula (II), it is preferable that M is aluminum.

As this inorganic filler, preferable is a filler having 10 $\mu$m or less, more preferable is a filler having 3 $\mu$m or less of a particle diameter. It is possible to desirably maintain resistant properties of a vulcanized rubber composition against fracture and wearing.

In this invention, these inorganic fillers may be used alone, or in combination of two or more.

The reinforcing filler is used, preferably, in an amount of 10 to 250 parts by weight per 100 parts by weight of the rubber component. From the standpoint of the reinforcing property and the effect of improving various properties by the reinforcement, it is preferable that the reinforcing filler is used in an amount of 20 to 150 parts by weight. As the amount becomes less, the effect of improving fracture resistance becomes smaller, while as the amount becomes larger, processability of the unvulcanized rubber composition becomes poorer.

In the rubber composition of the present invention, when an inorganic filler is used as a filler, a silane coupling agent may be used in the preparation of the rubber composition to further enhance reinforcing property. Preferable examples of the silane coupling agent include bis(3-triethoxysilylpropyl) polysulfide and bis(2-triethoxysilylethyl) polysulfide.

From the standpoint of enhancing the reinforcing property, it is preferable that the silane coupling agent is used in an amount of 1 to 20% by weight and more preferably 5 to 15% by weight of the inorganic filler used in the rubber composition although the amount varies depending on the type of the silane coupling agent and the amount of the inorganic filler.

The rubber composition of the present invention may further comprise a vulcanizing agent, a vulcanization accelerator, a process oil and a liquid low molecular weight diene copolymer.

Examples of the vulcanizing agent include sulfur and sulfur donating compounds. It is preferable that the amount of the vulcanizing agent as sulfur used in the rubber composition is 0.1 to 10 parts by weight and more preferably 1 to 5 parts by weight per 100 parts by weight of the rubber component. As the amount becomes smaller, fracture resistance, abrasion resistance and low heat generation property lower, while as the amount becomes larger, the rubber elasticity decreases. Therefore, amounts within the above range are preferable.

The vulcanization accelerator is not particularly limited. Preferable examples of the vulcanization accelerator include thiazole type vulcanization accelerators such as 2-mercaptobenzothiazole (M), dibenzothiazyl disulfilde (DM) and N-cyclohexyl-2-benzothiazyl-sulfenamide (CZ), and guanidine type vulcanization accelerators such as diphenylguanidine (DPG). The amount of the vulcanization accelerator is mainly decided in accordance with the required rate of vulcanization of the rubber composition. In general, it is preferable that the amount is 0.1 to 7 parts by weight and more preferably 1 to 5 parts by weight per 100 parts by weight of the rubber component. In general, the rubber composition containing silica requires the vulcanization accelerator in a larger amount.

Examples of the process oil include paraffinic oils, naphthenic oils and aromatic oils. When the application requires an improvement in tensile strength or abrasion resistance, aromatic oils are preferable. When the application requires an improvement in hysteresis loss property or properties at low temperatures, naphthenic oils and paraffinic oils are preferable. It is preferable that the amount of the process oil is not more than 100 parts by weight per 100 parts by weight of the rubber component. As the amount becomes larger, the tensile strength and the low heat generation property of the vulcanized rubber lower.

As the liquid low molecular weight diene polymer, liquid polybutadiene (liquid BR) and liquid styrene-butadiene copolymers (liquid SBR) can be preferably used.

In the present invention, additives conventionally used in the rubber industry such as an anti-aging agent, zinc oxide, stearic acid, an antioxidant and an anti-ozonant may also be suitably used.

The rubber composition of the present invention can be obtained by mixing the components using an open type mixing machine such as a roll, or a closed type mixing machine such as a Bambary mixer. After building, the rubber composition is vulcanized and used as various rubber products. Examples of the application include a member of a tire such as a tire tread, an undertread, a carcass, a side wall and a bead portion and industrial rubber products such as a vibration isolation rubber, a dock fender, a belt and a hose. In particular, the rubber composition can be advantageously used as a tire tread.

To summarized the advantages of the present invention, the rubber composition simultaneously exhibiting an excellent gripping property and an excellent fracture resistance can be obtained by mixing a specific amount of an olefin-aromatic vinyl compound copolymer with a rubber component. The rubber composition can be applied to tires, and industrial products such as a vibration isolation rubber and, in particular, effectively to a tread rubber of a high performance pneumatic tire.

EXAMPLES

The present invention will be described more specifically with reference to examples in the following. The present invention is, however, not limited to the examples.

The properties were evaluated in accordance with the following methods.
(A) Properties of a Polymer
(1) Weight-Average Molecular Weight The weight-average molecular weight was measured by using a gel permeation chromatography [the apparatus: HLC-8020, manufactured by TOSO Co., Ltd.; the column: GMH-XL, manufactured by TOSO Co., Ltd., two columns in series] using a differential refractive index (RI). The result was expressed as the value of corresponding polystyrene using monodispersed polystyrene as the reference.

(2) Amount of Vinyl Linkage (1,2-Bonding)

The amount of vinyl linkage in the butadiene portion of a polymer was obtained in accordance with the Morero's method from the result of measurement by using infrared spectroscopy.

(3) Amount of Bound Styrene

The amount of bound styrene was calculated from the ratio of areas obtained by integration of a $^1$H-NMR spectrum.

(4) Compatibility of Polymers

An olefin-aromatic vinyl compound copolymer alone was mixed with a rubber component and compatibility of these components was evaluated by observation by using an electron microscope. The result was classified into the following four grades: excellent, good, fair and poor.

(B) Evaluation of a Vulcanized Rubber (5) Strength at Break (Fracture Strength)

The strength at break was measured in accordance with the method of Japanese Industrial Standard K6251-1993. The result was expressed as an index based on the result of Comparative Example 1, 3 or 5 which was set at 100. The greater the index, the better the result.

(6) Wet Skid Resistance and Dry Skid Resistance

The surface of a wet road or a dry road was simulated by using a skid tester and wet skid resistance or dry skid resistance was evaluated. The result was expressed as an index based on the result of Comparative Example 1, 3 or 5 which was set at 100. The greater the index, the better the result.

(7) Abrasion Resistance

The amount of abrasion was measured by using a Lambourn abrasion tester at the room temperature under the slip ratio of 60%. The result was expressed as an index based on the inverse of the result of Comparative Example 1, 3 or 5 which was set at 100. The greater the index, the better the result.

Synthesis Examples 1 to 5

Synthesis of Olefin-Aromatic Vinyl Compound Copolymers

The synthesis was conducted in accordance with the process described as run numbers 2 to 6 in Table 1 in Macromolecules, (1997) 30, 685–693. Into a 100 ml reactor purged with nitrogen, 30 ml of toluene as a solvent, 10 ml of a two-component catalyst composed of cyclopentadienyl-triphenoxytitanium and methylaluminoxane (aluminum/titanium=589 (the ratio of amounts by mole)) and 10 ml of styrene were placed. The resultant mixture was heated at 60° C. while being stirred. Into the stirred mixture, ethylene was introduced in an amount such that the partial pressure of ethylene was 1.15 kg/cm$^2$. After the polymerization was conducted for 60 minutes, the reaction was terminated by adding methanol. Using the obtained copolymer (A-1), amount of bound styrene and weight-average molecular weight (Mw) were measured in accordance with the methods described above. The results are shown in Table 1.

Copolymers A-2 to A-5 were obtained in accordance with the same procedures as those conducted for synthesizing copolymer A-1 except that the ratio of the amount of styrene to the amount of ethylene used in said procedure was changed. Using the obtained copolymers, amount of bound styrene and weight-average molecular weight (Mw) were measured in accordance with the methods described above. The results are shown in Table 1.

TABLE 1

| Synthesis Example | 1 | 2 | 3 | 4 | 5 |
|---|---|---|---|---|---|
| Styrene-ethylene copolymer | A-1 | A-2 | A-3 | A-4 | A-5 |
| Amount of bound styrene (% by weight) | 82 | 75 | 61 | 53 | 46 |
| Weight-average molecular weight (× 10$^3$) | 89 | 68 | 42 | 28 | 31 |

Synthesis Example 6 to 10

Synthesis of Olefin-Aromatic Vinyl Compound Copolymers

Copolymers A-6 to A-8 were obtained in accordance with the same procedures as those conducted for synthesizing copolymer A-5 except that the amount of styrene used in said procedure was changed. Copolymers A-9 and A-10 were obtained in accordance with the same procedures as those conducted for synthesizing copolymer A-5 except that the ratio of the amount of styrene to the amount of ethylene used in said procedure was changed and the polymerization temperature was lowered. Using the obtained copolymers, a amount of bound styrene and weight-average molecular weight (Mw) were measured in accordance with the methods described above. The results are shown in Table 2.

TABLE 2

| Synthesis Example | 6 | 7 | 8 | 9 | 10 |
|---|---|---|---|---|---|
| Styrene-ethylene copolymer | A-6 | A-7 | A-8 | A-9 | A-10 |
| Amount of bound styrene (% by weight) | 33 | 26 | 15 | 45 | 56 |
| Weight-average molecular weight (× 10$^3$) | 29 | 28 | 24 | 150 | 183 |

Synthesis Example 11 to 13

Synthesis of SBR

Into a pressure-resistant 800 ml glass bottle which was dried and purged with nitrogen, 300 g of cyclohexane, 32.5 g of 1,3-butadiene, 17.5 g of styrene and 0.16 mmole of 2,2-bis(tetrahydrofuryl)propane were injected. After adding 0.45 mmole of n-butyllithium to the above mixture, the polymerization was conducted at 50° C. for 2 hours. The polymerization system contained no precipitates, and was homogeneous and clear throughout the period of polymerization. The reaction was terminated with methanol to obtain polymer B1. The conversion of polymerization was about 100%. Polymers B2 and B3 were obtained in accordance with the same procedures as those conducted for synthesizing polymer B1 except that the amount of n-butyllithium, the feed ratio of styrene to butadiene, and the amount of 2,2-bis(tetrahydrofuryl)propane were charged. Using the obtained copolymers B-1, B-2 and B-3, amount of bound styrene, amount of the vinyl bond and weight-average molecular weight (Mw) were measured in accordance with the methods described above. The results are shown in Table 3.

TABLE 3

|  | Synthesis Example | | |
|---|---|---|---|
|  | 11 | 12 | 13 |
| Styrene-butadiene copolymer | B-1 | B-2 | B-3 |
| Amount of bound styrene (% by weight) | 30 | 35 | 40 |
| Amount of vinyl structure (%) | 45 | 40 | 40 |
| Weight-average molecular weight (×10³) | 850 | 930 | 910 |

Examples 1 to 17 and Comparative Examples 1 to 5

In Examples 1 to 10 and Comparative Examples 1 and 2, copolymer B-1 obtained in Synthesis Example 11 was used as SBR (copolymer B). In Examples 11 to 13 and Comparative Examples 3 and 4, copolymer B-2 obtained in Synthesis Example 12 was used as SBR (copolymer B). In Examples 14 to 17 and Comparative Example 5, copolymer B-3 obtained in Synthesis Example 13 was used as SBR (copolymer B). Rubber compositions were prepared in the following manner.

As shown in Table 4, master batches were prepared by adding an olefin-aromatic vinyl compound copolymer (copolymer A) of the type shown in Table 4 in an amount also shown in Table 4 or an aromatic oil, 27 parts by weight of carbon black [manufactured by TOKAI CARBON Co., Ltd., trade mark: SEAST KH (N339)], 27 parts by weight of silica [manufactured by NIPPON SILICA INDUSTRIAL Co., Ltd.; trade mark: NIPSIL AQ], 2.5 parts by weight of a silane coupling agent [manufactured by DEGUSSA AG; trade mark: Si69; bis(3-triethoxysilylpropyl) tetrasulfide], 2 parts by weight of stearic acid and 1 part by weight of antioxidant [N-(1,3-dimethylbutyl)-N'-phenyl-p-phenylenediamine] to 100 parts by weight of SBR obtained in Synthesis Example (copolymer B). Rubber compositions were prepared by adding 3 parts by weight of zinc oxide, 0.8 parts by weight of vulcanization accelerator (diphenylguanidine), 1 part by weight of vulcanization accelerator (dibenzothiazyl disulfide), 1 part by weight of vulcanization accelerator (N-t-butyl-2-benzothiazylsulfenamide) and 1.5 parts by weight of sulfur to the respective master batches prepared above.

The prepared rubber compositions were vulcanized at 160° C. for 15 minutes. Using the obtained vulcanized rubbers, fracture strength, wet skid resistance, dry gripping property (dry skid resistance) and abrasion resistance were measured in accordance with the above methods. The results are shown in Table 4.

TABLE 4-1

|  | Comparative Example | | Example | | | |
|---|---|---|---|---|---|---|
|  | 1 | 2 | 1 | 2 | 3 | 4 |
| Copolymer B obtained in Synthesis Example (part by weight) | B-1 100 | B-1 100 | B-1 100 | B-1 100 | B-1 100 | B-1 100 |
| Copolymer A obtained in Synthesis Example (part by weight) | — — | A-1 40 | A-2 40 | A-3 40 | A-4 40 | A-5 40 |
| Aromatic oil (part by weight) | 40 | — | — | — | — | — |
| Compatibility of Copolymers A and B | — | poor | fair | good | excellent | excellent |
| Fracture strength (index) | 100 | 110 | 121 | 125 | 130 | 130 |
| Wet skid resistance (index) | 100 | 105 | 110 | 116 | 118 | 117 |
| Dry gripping property (index) | 100 | 95 | 102 | 113 | 122 | 121 |
| Abrasion resistance (index) | 100 | 98 | 100 | 105 | 110 | 109 |

TABLE 4-2

| Example Comparative Example | 5 | 6 | 7 | 8 | 9 | 10 |
|---|---|---|---|---|---|---|
| Copolymer B obtained in Synthesis Example (part by weight) | B-1 100 | B-1 100 | B-1 100 | B-1 100 | B-1 100 | B-1 100 |
| Copolymer A obtained in Synthesis Example (part by weight) | A-6 40 | A-7 40 | A-8 40 | A-9 40 | A-10 40 | A-5 20 |
| Aromatic oil (part by weight) | — | — | — | — | — | 20 |
| Compatibility of Copolymers A and B | good | fair | fair | good | good | excellent |
| Fracture strength (index) | 121 | 111 | 105 | 135 | 137 | 116 |
| Wet skid resistance (index) | 110 | 107 | 106 | 115 | 117 | 108 |
| Dry gripping property (index) | 107 | 105 | 103 | 120 | 118 | 110 |
| Abrasion resistance (index) | 115 | 110 | 107 | 113 | 115 | 107 |

TABLE 4-3

|  | Comparative Example | | Example | | |
|---|---|---|---|---|---|
|  | 3 | 4 | 11 | 12 | 13 |
| Copolymer B obtained in Synthesis Example (part by weight) | B-2 100 | B-2 100 | B-2 100 | B-2 100 | B-2 100 |
| Copolymer A obtained in Synthesis Example (part by weight) | — — | A-1 40 | A-4 40 | A-8 40 | A-10 40 |
| Aromatic oil (part by weight) | 40 | — | — | — | — |
| Compatibility of Copolymers A and B | — | poor | excellent | fair | good |
| Fracture strength (index) | 100 | 108 | 128 | 103 | 136 |
| Wet skid resistance (index) | 100 | 103 | 117 | 102 | 115 |
| Dry gripping property (index) | 100 | 94 | 125 | 102 | 113 |
| Abrasion resistance (index) | 100 | 97 | 113 | 101 | 116 |

TABLE 4-4

|  | Comparative Example | Example | | | |
| --- | --- | --- | --- | --- | --- |
|  | 5 | 14 | 15 | 16 | 17 |
| Copolymer B obtained in Synthesis Example (part by weight) | B-3 100 | B-3 100 | B-3 100 | B-3 100 | B-3 100 |
| Copolymer A obtained in Synthesis Example (part by weight) | — | A-2 40 | A-4 40 | A-7 40 | A-10 40 |
| Aromatic oil (part by weight) | 40 | — | — | — | — |
| Compatibility of Copolymers A and B | — | fair | excellent | fair | good |
| Fracture strength (index) | 100 | 123 | 131 | 104 | 133 |
| Wet skid resistance (index) | 100 | 106 | 115 | 105 | 112 |
| Dry gripping property (index) | 100 | 103 | 121 | 103 | 109 |
| Abrasion resistance (index) | 100 | 101 | 110 | 102 | 113 |

In the results shown above, Comparative Example 1 was used as the control for Comparative Example 2 and Examples 1 to 10, Comparative Example 3 was used as the control for Comparative Example 4 and Examples 11 to 13 and Comparative Example 5 was used as the control for Examples 14 to 17. It is shown by the results that the vulcanized rubbers of Examples exhibit more excellent physical properties than those of the vulcanized rubbers of Comparative Examples with respect to all of fracture strength, wet skid resistance, dry skid resistance and the abrasion resistance.

What is claimed is:

1. A rubber composition which is obtained by compounding 100 parts by weight of a rubber component and 3 to 250 parts by weight of a copolymer of only a monoolefin and an aromatic vinyl compound.

2. A rubber composition according to claim 1, wherein the rubber component is at least one component selected from the group consisting of a butadiene based polymer, an isoprene based polymer and a copolymer of butadiene or isoprene with an aromatic vinyl compound.

3. A rubber composition according to claim 1, wherein the rubber component is a styrene-butadiene copolymer.

4. A rubber composition according to claim 1, wherein the binary copolymer is a styrene-α-olefin copolymer.

5. A rubber composition according to claim 1, wherein the binary copolymer is a styrene-ethylene copolymer.

6. A rubber composition according to claim 1, which further comprises a filler.

7. A rubber composition according to claim 6, wherein the filler is at least one filler selected from carbon black silica, and aluminas.

8. A rubber composition according to claim 1, wherein the molecular weight of the binary copolymer of a monoolefin and an aromatic vinyl compound is about 2,500 to 700,000.

9. A rubber composition according to claim 8, wherein the molecular weight of the binary copolymer of a monoolefin and an aromatic vinyl compound is about 2,500 to 183,000.

10. A rubber composition according to claim 8, wherein the molecular weight of the binary copolymer of a monoolefin and an aromatic vinyl compound is about 2,500 to 42,000.

* * * * *